United States Patent
Kwon et al.

(10) Patent No.: US 11,962,034 B2
(45) Date of Patent: Apr. 16, 2024

(54) SEPARATOR AND ELECTROCHEMICAL DEVICE INCLUDING THE SAME

(71) Applicant: LG CHEM, LTD., Seoul (KR)

(72) Inventors: Hye-Jin Kwon, Daejeon (KR); In-Hyouk Sung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 611 days.

(21) Appl. No.: 17/268,166

(22) PCT Filed: Nov. 1, 2019

(86) PCT No.: PCT/KR2019/014763
§ 371 (c)(1),
(2) Date: Feb. 12, 2021

(87) PCT Pub. No.: WO2020/091537
PCT Pub. Date: May 7, 2020

(65) Prior Publication Data
US 2021/0320379 A1  Oct. 14, 2021

(30) Foreign Application Priority Data
Nov. 1, 2018 (KR) .................. 10-2018-0133176

(51) Int. Cl.
| | | |
|---|---|---|
| H01M 50/00 | (2021.01) | |
| H01M 10/0525 | (2010.01) | |
| H01M 50/417 | (2021.01) | |
| H01M 50/443 | (2021.01) | |
| H01M 50/446 | (2021.01) | |
| H01M 50/449 | (2021.01) | |
| H01M 50/489 | (2021.01) | |
| H01G 11/52 | (2013.01) | |

(52) U.S. Cl.
CPC ..... *H01M 50/446* (2021.01); *H01M 10/0525* (2013.01); *H01M 50/417* (2021.01); *H01M 50/443* (2021.01); *H01M 50/449* (2021.01); *H01M 50/489* (2021.01); *H01G 11/52* (2013.01)

(58) Field of Classification Search
CPC ............ H01M 50/461; H01M 50/446; H01M 10/0525; H01M 4/622; H01M 50/457; H01M 50/4295; H01M 50/443; H01M 50/414; H01M 50/417; Y02E 60/10
See application file for complete search history.

(56) References Cited

U.S. PATENT DOCUMENTS

| | | |
|---|---|---|
| 2014/0120402 A1 | 5/2014 | Yu et al. |
| 2014/0239239 A1 | 8/2014 | Cha et al. |
| 2016/0141575 A1 | 5/2016 | Sasaki et al. |
| 2016/0268565 A1 | 9/2016 | Sasaki et al. |
| 2018/0277815 A1 | 9/2018 | Sung et al. |

FOREIGN PATENT DOCUMENTS

| | | | |
|---|---|---|---|
| CN | 107851762 A | 3/2018 | |
| CN | 105659426 B | * 4/2018 | ........ H01M 10/0525 |
| EP | 3 591 736 A1 | 1/2020 | |
| JP | 2017-98203 A | 6/2017 | |
| KR | 10-2013-0022395 A | 3/2013 | |
| KR | 10-2014-0106301 A | 9/2014 | |
| KR | 10-2017-0032722 A | 3/2017 | |
| KR | 10-2017-0112250 A | 10/2017 | |
| KR | 10-2018-0003177 A | 1/2018 | |
| WO | WO 2015/005151 A1 | 1/2015 | |

OTHER PUBLICATIONS

Akiike et al, Lithium Ion Secondary Battery For Adhesive Of The Particulate Polymer, And Porous Bonding Layer Film Composition, Apr. 2008. See the Abstract. (Year: 2018).*
International Search Report (PCT/ISA/210) issued in PCT/KR2019/014763, dated Feb. 21, 2020.
Malvern Instruments Limited, "A Basic Guide to Particle Characterization," Malvem Instruments Worldwide—White Paper, XP055089322, 2012, pp. 1-26.
Extended European Search Report for European Application No. 19879112.1, daled Dec. 2, 2021.
Fedelich et al., "Application Handbook Thermal Analysis of Polymers Selected Applications Thermal Analysis," Mettler-Toledo AG, XP055608279, 2013, pp. 1-40.

* cited by examiner

*Primary Examiner* — Chanceity N Robinson
*Assistant Examiner* — Monique M Wills
(74) *Attorney, Agent, or Firm* — Birch, Stewart, Kolasch & Birch, LLP

(57) ABSTRACT

A separator including: a porous polymer substrate having a plurality of pores; and a porous coating layer on at least one surface of the porous polymer substrate. The porous coating layer comprises inorganic particles, core-shell type polymer particles having a core portion and a shell portion surrounding the core portion, and a binder polymer positioned on the whole or a part of the surface of the inorganic particles and core-shell type polymer particles to connect and fix the inorganic particles and core-shell type polymer particles with one another. The core portion has a glass transition temperature, $T_g$, higher than the shell portion in the core-shell type polymer particles. The ratio of the average diameter of the core-shell type polymer particles to the average diameter of the inorganic particles is 80% to 200%.

11 Claims, No Drawings

SEPARATOR AND ELECTROCHEMICAL DEVICE INCLUDING THE SAME

TECHNICAL FIELD

The present disclosure relates to a separator and an electrochemical device including the same. Particularly, the present disclosure relates to a separator which shows improved adhesion to an electrode and has an excellent effect of reducing resistance, and an electrochemical device including the same.

The present application claims priority to Korean Patent Application No. 10-2018-0133176 filed on Nov. 1, 2018 in the Republic of Korea, the disclosures of which are incorporated herein by reference.

BACKGROUND ART

Recently, energy storage technology has been given an increasing attention. Efforts into research and development for electrochemical devices have been actualized more and more, as the application of energy storage technology has been extended to energy for cellular phones, camcorders and notebook PC and even to energy for electric vehicles. In this context, electrochemical devices have been most spotlighted. Among such electrochemical devices, development of rechargeable secondary batteries has been focused. More recently, active studies have been conducted about designing a novel electrode and battery in order to improve the capacity density and specific energy in developing such batteries.

Among the commercially available secondary batteries, lithium secondary batteries developed in the early 1990's have been spotlighted, since they have a higher operating voltage and significantly higher energy density as compared to conventional batteries, such as Ni-MH, Ni—Cd and sulfuric acid-lead batteries using an aqueous electrolyte. However, such a lithium ion battery has safety-related problems, such as ignition and explosion, caused by the use of an organic electrolyte, and is disadvantageous in that it requires a complicated manufacturing process.

More recently, a lithium ion polymer battery improves the above-mentioned disadvantages of the lithium ion battery, and thus is expected to be one of the next-generation batteries. However, the lithium ion polymer battery sill has relatively lower capacity as compared to the lithium ion battery, and particularly shows insufficient discharge capacity at low temperature. Thus, there is an imminent need for improving the above-mentioned problems.

Although such electrochemical devices have been produced from many production companies, safety characteristics thereof show different signs. Evaluation and securement of safety of such electrochemical devices are very important. The most important consideration is that electrochemical devices should not damage users upon their malfunction. For this purpose, safety standards strictly control ignition and smoke emission in electrochemical devices. With regard to safety characteristics of electrochemical devices, there is great concern about explosion when an electrochemical device is overheated to cause thermal runaway or perforation of a separator. Particularly, a polyolefin-based porous substrate used conventionally as a separator for an electrochemical device shows a severe heat shrinking behavior at a temperature of 100° C. or higher due to its material property and a characteristic during its manufacturing process, including orientation, thereby causing a short-circuit between a cathode and an anode.

To solve the above-mentioned safety problems of an electrochemical device, there has been suggested a separator having a porous organic-inorganic coating layer formed by applying a mixture of an excessive amount of inorganic particles with a binder polymer onto at least one surface of a porous substrate having a plurality of pores.

However, introduction of such a porous organic-inorganic coating layer causes problems, such as an increase in resistance of the separator and degradation of adhesion to an electrode. Therefore, there is a need for a solution for the problems.

DISCLOSURE

Technical Problem

The present disclosure is designed to solve the problems of the related art, and therefore the present disclosure is directed to providing a separator which has improved adhesion to an electrode and shows an excellent effect of reducing resistance.

The present disclosure is also directed to providing an electrochemical device including the separator.

Technical Solution

In one aspect of the present disclosure, there is provided a separator according to any one of the following embodiments.

According to the first embodiment of the present disclosure, there is provided a separator including:

a porous polymer substrate having a plurality of pores; and a porous coating layer on at least one surface of the porous polymer substrate, wherein the porous coating layer comprises inorganic particles, core-shell type polymer particles having a core portion and a shell portion surrounding the core portion, and a binder polymer positioned on the whole or a part of the surface of the inorganic particles and core-shell type polymer particles to connect and fix the inorganic particles and core-shell type polymer particles with one another, wherein the core portion has a glass transition temperature, $T_g$, higher than a glass transition temperature, $T_g$, of the shell portion in the core-shell type polymer particles, the core-shell type polymer particles have an average glass transition temperature, $T_g$, of −5° C. to 80° C., the ratio of the average diameter of the core-shell type polymer particles to the average diameter of the inorganic particles is 80% to 11200%, and the ratio of the average diameter of the core portion to the average diameter of the core-shell type polymer particles is 30% to 60%.

According to the second embodiment of the present disclosure, there is provided the separator as defined in the first embodiment, wherein the difference between the $T_{g_c}$ of the core portion of the core-shell type polymer particles and the $T_g$ of the shell portion of the core-shell type polymer particles is 10° C. to 200° C., According to the third embodiment of the present disclosure, there is provided the separator as defined in the first or the second embodiment, wherein the ratio of the average diameter of the core-shell type polymer particles to the average diameter of the inorganic particles is 80% to 190%.

According to the fourth embodiment of the present disclosure, there is provided the separator as defined in any one of the first to the third embodiments, wherein the ratio of the average diameter of the core portion of the core-shell type polymer particles to the average diameter of the core-shell type polymer particles is 30% to 50%.

According to the fifth embodiment of the present disclosure, there is provided the separator as defined in any one of the first to the fourth embodiments, wherein each of the core portion and the shell portion of the core-shell type polymer particles independently includes: a styrene-based polymer, diene-based polymer, acrylate-based polymer, ester-based polymer, olefin-based polymer, urethane-based polymer; polymer including styrene-derived repeating units, diene-derived repeating units, acrylate-derived repeating units, ester-derived repeating units, olefin-derived repeating units, urethane-derived repeating units, or at least two types of repeating units of them; or a mixture of two or more of such polymers.

According to the sixth embodiment of the present disclosure, there is provided the separator as defined in any one of the first to the fifth embodiments, wherein each of the core portion and the shell portion of the core-shell type polymer particles independently includes at least one of polystyrene, styrene butadiene copolymer, ethylene propylene diene copolymer, poly(meth)acrylate, polyalkyl (meth)acrylate, alkyl acrylate-alkyl (meth)acrylate copolymer, polyfluoroalkyl (meth)acrylate, polyacrylonitrile, polyester, polyethylene, polypropylene, ethylene propylene copolymer, polytetrafluoroethylene, chlorosulfonated polyethylene, polyethylene oxide, polyvinyl alcohol, polyvinyl pyrrolidone, polyvinyl pyridine, polyphosphazene, epoxy resin, butadiene rubber, styrene-butadiene rubber, acrylated styretie-butadiene rubber, acrylic rubber, acrylonitrile-butadiene rubber, acrylonitrile-butadiene-styrene rubber, isoprene rubber, isobutylene-isoprene rubber, ethylene-propylene rubber, ethylene-propylene-diene rubber, polyorganosiloxane-polyalkyl (meth)acrylate rubber, or fluororubber.

According to the seventh embodiment of the present disclosure, there is provided the separator as defined in any one of the first to the sixth embodiments, wherein the porous polymer substrate is a polyolefin-based porous polymer substrate.

According to the eighth embodiment of the present disclosure, there is provided the separator as defined in any one of the first to the seventh embodiments, wherein the binder polymer is at least one of polyvinylidene fluoride-co-hexafluoropropylene, polyvinylidene fluoride-co-trichloroethylene, polymethyl methacrylate, polybutyl acrylate, polybutyl methacrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinyl alcohol, cyanoethyl cellulose, cyanoethyl sucrose, pullulan, or carboxymethyl cellulose.

According to the ninth embodiment of the present disclosure, there is provided the separator as defined in any one of the first to the eighth embodiments, wherein the inorganic particles are at least one of inorganic particles having a dielectric constant of 5 or more, or inorganic particles having lithium ion transportability.

In another aspect of the present disclosure, there is also provided an electrochemical device as defined in any one of the following embodiments.

According to the tenth embodiment, there is provided an electrochemical device including a cathode, an anode and a separator interposed between the cathode and the anode, wherein the separator is the separator as defined in any one of the first to the ninth embodiments.

According to the eleventh embodiment, there is provided the electrochemical device as defined in the tenth embodiment, wherein the electrochemical device is a lithium secondary battery.

Advantageous Effects

According to an embodiment of the present disclosure, a porous coating layer including core-shell type polymer particles in combination with inorganic particles is introduced, wherein the core portion has a $T_g$ higher than $T_g$ of the shell portion in the core-shell type polymer particles, the core-shell type polymer particles have an average $T_g$ of −5 to 80° C., the ratio of the average diameter of the core-shell type polymer particles to the average diameter of the inorganic particles is 80-200%, and the ratio of the average diameter of the core portion to the average diameter of the core-shell type polymer particles is 30-60%. Thus, it is possible to provide a separator which has excellent adhesion to an electrode, shows reduced resistance, and ensures coating uniformity.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

The separator according to an embodiment of the present disclosure includes: a porous polymer substrate having a plurality of pores; and a porous coating layer disposed on at least one surface of the porous polymer substrate, and including a plurality of inorganic particles, core-shell type polymer particles having a core portion and a shell portion surrounding the core portion, and a binder polymer positioned on the whole or a part of the surface of the inorganic particles and core-shell type polymer particles to connect the inorganic particles and core-shell type polymer particles with one another and fix them, wherein the core portion has a $T_g$ higher than $T_g$ of the shell portion in the core-shell type polymer particles, the core-shell type polymer particles have an average $T_g$ of −5 to 80° C., the ratio of the average diameter of the core-shell type polymer particles to the average diameter of the inorganic particles is 80-200%, and the ratio of the average diameter of the core portion to the average diameter of the core-shell type polymer particles is 30-60%.

In the conventional separator having an aqueous coating layer, a water-dispersed particle type binder was applied to the coating layer of the separator in order to impart adhesive property between the separator and an electrode. Herein, when $T_g$ of the particle type binder is lower than the lamination temperature between the separator and the electrode, the particle type binder undergoes higher deformation so that adhesion to the electrode may be improved. However, when the particle type polymer resin has excessively low $T_g$, deformation of the particle type binder increases excessively so that the particle type binder may have a reduced surface area. As a result, there are still problems in that adhesion between the separator and an electrode is degraded and resistance is increased due to a surface filming phenomenon.

To solve the above-mentioned problems, the inventors of the present disclosure have focused on the following. It is required for the particle type binder introduced to the coating layer of the separator to allow easy deformation at the lamination temperature between the separator and the electrode in order to improve adhesion between the separator and the electrode. However, at the same time, it is required to control the degree of deformation of the particle type binder to the minimum level in order to minimize the resistance of the separator. As a result, the inventors of the present disclosure have suggested that core-shell type polymer particles are used as the particle type binder and the thermal properties of the core and shell, particularly, glass transition temperature ($T_g$) of the core and that of the shell are controlled to improve adhesion between the separator and the electrode and to minimize the resistance.

For example, polymer, such as polystyrene molecules, is in a solid state at room temperature, and thus it is in a glassy state at room temperature and is weak. When polystyrene is observed while its temperature is increased, the frozen molecular backbone starts to perform Brownian motion (intramolecular motion caused by rotation of intramolecular binding, wherein the whole molecule does not move sufficiently to change its position) at a specific temperature, resulting in a rapid increase in specific volume and a change into a rubbery phase. Such a change in state, i.e. a change from a glassy phase into a rubbery phase is referred to as glass transition, and the temperature where such a change occurs is referred to as glass transition temperature $T_g$ (T means temperature and g is the initial of glass). Above or below the temperature, a polymer material is solidified, weakened or softened. Thus, $T_g$ is regarded as important among the physical properties of polymer. In addition, at the temperature where Brownian motion is started (i.e. $T_g$), mechanical strength, dimension, or the like are changed. Therefore, when using a resin for a mechanical part, special attention should be given to the condition of use and $T_g$ of the resin. A difference in $T_g$ depending on type of polymer results from a difference in polymer structures or compositions.

$T_g$ of a copolymer having two or more repeating units varies with the composition of the repeating units forming the copolymer. $T_g$ of the copolymer may be determined by controlling the compositional ratio (i.e. molar ratio) of each repeating unit from $T_g$ value of homopolymer of each repeating unit.

In other words, when homopolymer of A monomer has a $T_g$ of a° C. and homopolymer of B monomer has a $T_g$ of b° C., $T_g$ of a copolymer including A monomer-derived repeating units and B monomer-derived repeating units at a molar ratio of x:y may be determined according to the following formula:

$T_g$ of copolymer having a molar ratio of x:y=[ax+by]/[x+y]

For example, when homopolymer of A monomer has a $T_g$ of −50° C. and homopolymer of B monomer has a $T_g$ of 110° C., $T_g$ of a copolymer including A monomer-derived repeating units and B monomer-derived repeating units at a molar ratio of 1:1 may have a $T_g$ of 30° C., and a copolymer including A monomer-derived repeating units and B monomer-derived repeating units at a molar ratio of 2:1 may have a $T_g$ of about 3.3° C.

According to the present disclosure, the separator includes a porous coating layer disposed on at least one surface of the porous polymer substrate, and including a plurality of inorganic particles, core-shell type polymer particles having a core portion and a shell portion surrounding the core portion, and a binder polymer positioned on the whole or a part of the surface of the inorganic particles and core-shell type polymer particles to connect the inorganic particles and core-shell type polymer particles with one another and fix them.

Herein, the core portion in the core-shell type polymer particles has a higher $T_g$ than $T_g$ of the shell portion. When the core portion in the core-shell type polymer particles has a higher $T_g$ than $T_g$ of the shell portion, the particles can retain their shapes by virtue of such a high $T_g$ of the core portion and resistance of the separator is not increased, even though $T_g$ of the shell portion disposed on the surface portion of the core-shell type polymer particles is reduced to improve adhesion between the separator and the electrode. Therefore, it is possible to minimize an increase in resistance and to increase adhesion to the electrode.

According to an embodiment of the present disclosure, the difference between $T_g$ of the core portion of the core-shell type polymer particles and $T_g$ of the shell portion thereof may be 10-200° C., 15-180° C., 20-160° C., or 20-80° C.

In addition, the ratio of the average diameter of the core-shell type polymer particles to the average diameter of the inorganic particles is 80-200%. According to an embodiment of the present disclosure, the ratio may be 80-190%, or 84-188%. When the ratio of the average diameter of the core-shell type polymer particles to the average diameter of the inorganic particles is 80-200%, the particle type binder may be distributed on the surface of the separator to provide an effect of adhering the separator with the electrode advantageously.

The average diameter ($D_{50}$) may be defined as diameter at 50% in the diameter distribution. According to the present disclosure, the average diameter ($D_{50}$) of the core-shell type polymer particles and that of the inorganic particles may be determined through electron microscopy, such as scanning electron microscopy (SEM) or field emission scanning electron microscopy (FE-SEM), or by using laser diffractometry. Particularly, when the average diameter is determined by using laser diffractometry, the core-shell type polymer particles or inorganic particles are dispersed in a dispersion medium, and then introduced to a commercially available laser diffraction particle size analyzer (e.g. Microtrac MT 3000). Then, ultrasonic waves are irradiated thereto at about 28 kHz and the average particle diameter ($D_{50}$) at 50% in the diameter distribution analyzed from the analyzer may be calculated.

The core-shell type polymer particles may have an average $T_g$ of −5 to 80° C. According to an embodiment of the present disclosure, the core-shell type polymer particles may have an average $T_g$ of −2 to 78.8° C., or 0 to 70° C. The average $T_g$ of the core-shell type polymer particles means the average of $T_g$ of the core portion and $T_g$ of the shell portion forming the core-shell type polymer particles.

Particularly, the average $T_g$ of the core portion and shell portion may be calculated according to the following formula:

Average $T_g$ of core portion and shell portion=($T_g$ of core portion)×(ratio (%) of average diameter of core portion)+($T_g$ of shell portion)×(100−ratio (%) of average diameter of core portion)

Herein, the ratio (%) of average diameter of core portion means the ratio (%) of the average diameter of the core portion based on the total average diameter of the core-shell type polymer particles.

When the average $T_g$ of the core-shell type polymer particles satisfies the above-defined range, the core-shell type polymer particles retain their shapes to ensure adhesion during the lamination of the separator with the electrode.

Herein, $T_g$ may be determined by using differential scanning calorimetry (DSC).

The polymers contained in the core portion and shell portion of the core-shell type polymer particles may be the same or different, and are not limited to particular types, as long as they satisfy the above-described condition of $T_g$.

According to an embodiment of the present disclosure, the polymers contained in the core portion and shell portion of the core-shell type polymer particles may be the same or different, and are not limited to particular types, as long as they satisfy the condition that $T_g$ of the core portion is higher than $T_g$ of the shell portion. For example, each of the polymers contained in the core portion and the shell portion independently includes: a styrene-based polymer, diene-based polymer, acrylate-based polymer, ester-based polymer, olefin-based polymer, urethane-based polymer; polymer including styrene-derived repeating units, diene-derived repeating units, acrylate-derived repeating units, ester-derived repeating units, olefin-derived repeating units, urethane-derived repeating units, or at least two types of repeating units of them; or a mixture of two or more of such polymers. More particularly, the polymer may include polystyrene, styrene butadiene copolymer, ethylene propylene diene copolymer, poly(meth)acrylate, polyalkyl (meth)acrylate, alkyl acrylate-alkyl (meth)acrylate copolymer, polyfluoroalkyl (meth)acrylate, polyacrylonitrile, polyester, polyethylene, polypropylene, ethylene propylene copolymer, polytetrafluoroethylene, chlorosulfonated polyethylene, polyethylene oxide, polyvinyl alcohol, polyvinyl pyrrolidone, polyvinyl pyridine, polyphosphazene, epoxy resin, a copolymer thereof, derivative thereof, or a combination thereof. Herein, alkyl may be a C1-C30 alkyl, C1-C15 alkyl, C1-C10 alkyl, or C1-C5 alkyl. In addition, particular examples of the alkyl acrylate-alkyl (meth)acrylate copolymer include 2-ethylhexyl acrylate-methyl methacrylate copolymer, or the like, but are not limited thereto.

For example, the polymer contained in the core portion and the polymer contained in the shell portion may include a rubbery polymer, such as butadiene rubber, styrene-butadiene rubber, acrylated styrene-butadiene rubber, acrylic rubber, acrylonitrile-butadiene rubber, acrylonitrile-butadiene-styrene rubber, isoprene rubber, isobutylene-isoprene rubber, ethylene-propylene rubber, ethylene-propylene-diene rubber, polyorganosiloxane-polyalkyl (meth)acrylate rubber, fluororubber, or a combination thereof.

The ratio of the average diameter of the core portion to the average diameter of the core-shell type polymer particles is 30-60%. According to an embodiment of the present disclosure, the ratio may be 30-50%, or 40-48%. When the ratio of the average diameter of the core portion to the average diameter of the core-shell type polymer particles satisfies the above-defined range, it is possible to provide an effect of reducing an increase in resistance after the lamination of the separator with the electrode, advantageously.

Herein, the average diameter of the core-shell type polymer particles, average diameter of the inorganic particles, and the average diameter of the core portion may be determined by using a particle size analyzer (laser particle size analyzer available from Malvern Co.). For example, the average diameter of the core portion may be determined after forming cores, and then the average diameter of the total particles may be determined after forming shells.

Particularly, the porous polymer substrate may be a porous polymer film substrate or a porous polymer nonwoven web substrate.

The porous polymer film substrate may be a porous polymer film including polyolefin, such as polyethylene or polypropylene. Such a polyolefin porous polymer film substrate may realize a shut-down function at a temperature of 80-130° C.

Herein, the polyolefin porous polymer film may be formed of polymers including polyolefin polymers, such as polyethylene, including high-density polyethylene, linear low-density polyethylene, low-density polyethylene or ultrahigh-molecular weight polyethylene, polypropylene, polybutylene, or polypentene, alone or in combination of two or more of them.

In addition, the porous polymer film substrate may be obtained by molding various polymers, such as polyesters, other than polyolefins, into a film shape. Further, the porous polymer film substrate may have a stacked structure of two or more film layers, wherein each film layer may be formed of polymers including the above-mentioned polymers, such as polyolefins or polyesters, alone or in combination of two or more of them.

In addition, the porous polymer film substrate and porous nonwoven web substrate may be formed of polyethylene terephthalate, polybutylene terephthalate, polyester, polyacetal, polyamide, polycarbonate, polyimide, polyetherether ketone, polyether sulfone, polyphenylene oxide, polyphenylene sulfide, or polyethylene naphthalate, alone or in combination, besides the above-mentioned polyolefins In addition, there is no particular limitation in the thickness of the porous substrate, the porous substrate has a thickness of 1-100 μm, particularly 5-50 μm. Although there is no particular limitation in the size of the pores present in the porous substrate and porosity, the pore size and porosity may be 0.01-50 μm and 10-95%, respectively.

In the separator according to the present disclosure, the binder polymer used for forming the porous coating layer may be a polymer used currently for forming a porous coating layer in the art. Particularly, a polymer having a glass transition temperature ($T_g$) of −200 to 200° C. may be used. This is because such a polymer can improve the mechanical properties, such as flexibility and elasticity, of the finally formed porous coating layer. The binder polymer functions as a binder which connects the inorganic particles with one another and stably fixes them, and thus contributes to prevention of degradation of mechanical properties of a separator having a porous coating layer.

In addition, it is not essentially required for the binder polymer to have ion conductivity. However, when using a polymer having ion conductivity, it is possible to further improve the performance of an electrochemical device. Therefore, a polymer having a dielectric constant as high as possible may be used as the binder polymer. In fact, since the dissociation degree of a salt in an electrolyte depends on the dielectric constant of the solvent for the electrolyte, use of a polymer having a higher dielectric constant as the binder polymer can improve the salt dissociation degree in an electrolyte. The binder polymer may have a dielectric constant ranging from 1.0 to 100 (measured at a frequency of 1 kHz), particularly 10 or more.

In addition to the above-mentioned function, the binder polymer may be characterized in that it is gelled upon the impregnation with a liquid electrolyte and thus shows a high degree of swelling. Thus, the binder polymer has a solubility parameter (i.e., Hildebrand solubility parameter) of 15-45 MPa$^{1/2}$ or 15-25 MPa$^{1/2}$ and 30-45 MPa$^{1/2}$. Therefore, hydrophilic polymers having many polar groups may be used more frequently as compared to hydrophobic polymers, such as polyolefins. When the solubility parameter is less than 15 MPa$^{1/2}$ or more than 45 MPa$^{1/2}$, it is difficult for the binder polymer to be swelled with a conventional liquid electrolyte for a battery.

Non-limiting examples of the binder polymer include but are not limited to: polyvinylidene fluoride-co-hexafluoropropylene, polyvinylidene fluoride-co-trichloroethylene, polymethyl methacrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinyl alcohol, cyanoethyl cellulose, cyanoethyl sucrose, pullulan and carboxymethyl cellulose.

The weight ratio of the core-shell type polymer particles to the inorganic particles may be 50:50-85:15, or 60:40-80:20. When the weight ratio satisfies the above-defined range, it is possible to reduce resistance, while ensuring adhesion to an electrode.

For example, the weight ratio of the inorganic particles to the binder polymer may be 50:50-99:1, particularly 70:30-95:5. When the weight ratio of the inorganic particles to the binder polymer satisfies the above-defined range, it is possible to prevent the problem of a decrease in pore size and porosity of the resultant coating layer, caused by an increase in content of the binder polymer. It is also possible to solve the problem of degradation of peeling resistance of the resultant coating layer, caused by a decrease in content of the binder polymer.

In the separator according to an embodiment of the present disclosure, the porous coating layer may further include other additives, in addition to the above-described inorganic particles and polymer.

According to the present disclosure, non-limiting examples of the inorganic particles include inorganic particles having a dielectric constant of 5 or more, particularly 10 or more, inorganic particles having lithium ion transportability or a mixture thereof.

Non-limiting examples of the inorganic particles having a dielectric constant of 5 or more may include $BaTiO_3$, $Pb(Zr,Ti)O_3$ (PZT, wherein $0<x<1$), $Pb_{1-x}La_xZr_{1-y}Ti_yO_3$ (PLZT, wherein $0<x<1$, $0<y<1$), $Pb(Mg_{1/3}Nb_{2/3})O_3PbTiO_3$(PMN-PT), hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, $TiO_2$, SiC, AlO(OH), $Al_2O_3$—$H_2O$, or a mixture thereof.

As used herein, 'inorganic particles having lithium ion transportability' refers to inorganic particles which contain lithium elements and do not store lithium but transport lithium ions. Non-limiting examples of the inorganic particles having lithium ion transportability include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$-based glass ($1<x<4$, $0<y<13$), such as $14Li_2O$-$9Al_2O_3$-$38TiO_2$-$39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), such as $Li_{3.25}Ge_{0.25}P_{0.75}S_4$, lithium nitride ($Li_xN_y$, $0<x<4$, $0<y<2$), such as $Li_3N$, $SiS_2$-based glass ($Li_xSi_yS_z$, $0<x<3$, $0<y<2$, $0<z<4$), such as $Li_3PO_4$—$Li_2S$—$SiS_2$, and $P_2S_5$-based glass ($Li_xP_yS_z$, $0<x<3$, $0<y<3$, $0<z<7$), such as LiI—$Li_2S$—$P_2S_5$, or a mixture of two or more of them.

Although there is no particular limitation in the thickness of the porous coating layer, the porous coating layer may have a thickness of 1-10 μm, particularly 1.5-6 μm. In addition, the porous coating layer preferably has a porosity of 35-65% but is not limited thereto.

According to an embodiment of the present disclosure, the porous coating layer may be an organic coating layer using organic slurry or an aqueous coating layer using aqueous slurry. Particularly, aqueous coating layer may be more advantageous in that it facilitates thin film coating and provides a separator with reduced resistance.

The separator according to an embodiment of the present disclosure may be obtained by the following method.

First, a composition for forming a porous coating layer may be obtained by dissolving a binder polymer into a solvent, adding inorganic particles and core-shell type polymer particles thereto and dispersing them in order to form a porous coating layer. The inorganic particles may be added after they are pulverized in advance to a predetermined average particle diameter. Otherwise, the inorganic particles and core-shell type polymer particles may be added to a binder polymer solution, and then pulverized and dispersed, while controlling them to have a predetermined average particle diameter by using a ball milling process, or the like.

The core-shell type polymer particles may be obtained by various known processes, such as emulsion polymerization, suspension polymerization, massive polymerization, solution polymerization, bulk polymerization, or the like. For example, the core-shell type polymer particles may be obtained by an emulsion polymerization process.

Although there is no particular limitation in the process for coating the composition for forming a porous coating layer onto the porous substrate, it is preferred to use a slot coating or dip coating process. A slot coating process includes coating a composition supplied through a slot die onto the whole surface of a substrate and is capable of controlling the thickness of a coating layer depending on the flux supplied from a metering pump. In addition, dip coating includes dipping a substrate into a tank containing a composition to carry out coating and is capable of controlling the thickness of a coating layer depending on the concentration of the composition and the rate of removing the substrate from the composition tank. Further, in order to control the coating thickness more precisely, it is possible to carry out post-metering through a Mayer bar or the like, after dipping.

Then, the porous substrate coated with the composition for forming a porous coating layer is dried by using a dryer, such as an oven, thereby forming porous coating layers on at least one surface of the porous substrate.

According to an embodiment of the present disclosure, the binder in the porous coating layer allows the inorganic particles and core-shell type polymer particles to be attached to one another so that they may retain their binding states (i.e. the binder connects the inorganic particles and core-shell type polymer particles to one another and fixes them). In addition, the inorganic particles and core-shell type polymer particles may be retained to be bound to the porous polymer substrate by the binder. The inorganic particles and core-shell type polymer particles in the porous coating layer form interstitial volumes, while they are in contact with another substantially. Herein, the interstitial volumes mean spaces defined by the inorganic particles and core-shell type particles that are in contact with one another substantially in a closely packed or densely packed structure of the inorganic particles and core-shell type polymer particles. Then, the interstitial volumes formed among the inorganic particles and core-shell type polymer particles become vacant spaces, thereby forming pores of the porous coating layer.

Non-limiting examples of the solvent that may be used herein include any one selected from acetone, tetrahydrofuran, methylene chloride, chloroform, dimethyl formamide, N-methyl-2-pyrrolidone, methyl ethyl ketone, cyclohexane, methanol, ethanol, isopropyl alcohol, propanol and water, or a mixture of two or more of them.

After coating the porous polymer substrate with the composition for forming a porous coating layer, the solvent may be removed by drying the composition at 90-180° C., particularly 100-150° C.

In still another aspect of the present disclosure, there is provided an electrochemical device including a cathode, an anode and a separator interposed between the cathode and the anode, wherein the separator is the above-described separator.

The electrochemical device includes any device which carries out electrochemical reaction, and particular examples thereof include all types of primary batteries, secondary batteries, fuel cells, solar cells or capacitors, such as super capacitor devices. Particularly, among the secondary batteries, lithium secondary batteries, including lithium metal secondary batteries, lithium ion secondary batteries, lithium polymer secondary batteries or lithium ion polymer batteries, are preferred.

The two electrodes, cathode and anode, used in combination with the separator according to the present disclosure are not particularly limited, and may be obtained by allowing electrode active materials to be bound to an electrode current collector through a method generally known in the art. Among the electrode active materials, non-limiting examples of a cathode active material include conventional cathode active materials that may be used for the cathodes for conventional electrochemical devices. Particularly, lithium manganese oxides, lithium cobalt oxides, lithium nickel oxides, lithium iron oxides or lithium composite oxides containing a combination thereof are used preferably. Non-limiting examples of an anode active material include conventional anode active materials that may be used for the anodes for conventional electrochemical devices. Particularly, lithium-intercalating materials, such as lithium metal or lithium alloys, carbon, petroleum coke, activated carbon, graphite or other carbonaceous materials, are used preferably. Non-limiting examples of a cathode current collector include foil made of aluminum, nickel or a combination thereof. Non-limiting examples of an anode current collector include foil made of copper, gold, nickel, copper alloys or a combination thereof.

The electrolyte that may be used in the electrochemical device according to the present disclosure is a salt having a structure of $A^+B^-$, wherein $A^+$ includes an alkali metal cation such as $Li^+$, $Na^+$, $K^+$ or a combination thereof, and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the salt being dissolved or dissociated in an organic solvent including propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (γ-butyrolactone) or a combination thereof. However, the present disclosure is not limited thereto.

Injection of the electrolyte may be carried out in an adequate step during the process for manufacturing a battery depending on the manufacturing process of a final product and properties required for a final product. In other words, injection of the electrolyte may be carried out before the assemblage of a battery or in the final step of the assemblage of a battery.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

First, carboxymethyl cellulose (CMC) as a binder polymer was added to water as a solvent and agitated at 40° C. for about 3 hours to prepare a binder polymer solution. Alumina ($Al_2O_3$) particles (average diameter: 500 nm) as inorganic particles and core-shell type polymer particles were added to the resultant binder polymer solution and dispersed therein to prepare slurry for a porous coating layer.

Herein, the weight ratio of the core-shell type polymer particles, inorganic particles and the binder polymer was 70:29:1 (core-shell type polymer particles:inorganic particles:binder polymer). In addition, the core-shell type polymer particles have a core portion including copolymer of 2-ethylhexyl acrylate with methyl methacrylate and a shell portion including copolymer of 2-ethylhexyl acrylate with methyl methacrylate. $T_g$ of the core portion and that of the shell portion of the core-shell type polymer particles, and average $T_g$ and diameter of the core-shell type polymer particles are shown in the following Table 1.

As described above, $T_g$ of the core portion and that of the shell portion of the core-shell type polymer particles correspond to $T_g$ of the polymer forming the core portion and that of the polymer forming the shell portion, respectively. When each of the polymers forming the core portion and the shell portion is a copolymer having two or more repeating units, $T_g$ of the copolymer may be determined by controlling the compositional ratio (i.e. molar ratio) of each repeating unit from $T_g$ value of homopolymer of each repeating unit.

In other words, when homopolymer of A monomer has a $T_g$ of a° C. and homopolymer of B monomer has a $T_g$ of b° C., $T_g$ of a copolymer including A monomer-derived repeating units and B monomer-derived repeating units at a molar ratio of x:y may be determined according to the following formula:

$T_g$ of copolymer having a molar ratio of $x:y=[ax+by]/[x+y]$

Herein, 2-ethylhexyl acrylate homopolymer has a $T_g$ of −52.5° C. and methyl methacrylate homopolymer has a $T_g$ of 115° C.

The resultant slurry was coated on both surfaces of a polyethylene porous membrane (resistance 0.66 ohm, permeability 142 sec/100 cc) having a thickness of 9 μm by dip coating process and dried in an oven at 100° C. to obtain a separator provided with porous coating layers on both surfaces thereof. Herein, the total thickness of the porous coating layer was 6 μm.

Example 2

A separator was obtained in the same manner as Example 1, except that core-shell type polymer particles have a core portion including 2-ethylhexyl acrylate homopolymer and a shell portion including methyl methacrylate homopolymer, and $T_g$ of the core portion and that of the shell portion of the core-shell type polymer particles, and average $T_g$ and diameter of the core-shell type polymer particles are those as shown in Table 1.

Example 3

A separator was obtained in the same manner as Example 1, except that core-shell type polymer particles have a core portion including copolymer of 2-ethylhexyl acrylate with methyl methacrylate and a shell portion including copolymer of 2-ethylhexyl acrylate with methyl methacrylate, and $T_g$ of the core portion and that of the shell portion of the core-shell type polymer particles, and average $T_g$ and diameter of the core-shell type polymer particles are those as shown in Table 1.

Example 4

A separator was obtained in the same manner as Example 1, except that core-shell type polymer particles have a core portion including copolymer of 2-ethylhexyl acrylate with methyl methacrylate and a shell portion including copolymer of 2-ethylhexyl acrylate with methyl methacrylate, and $T_g$ of the core portion and that of the shell portion of the core-shell type polymer particles, and average $T_g$ and diameter of the core-shell type polymer particles are those as shown in Table 1.

Example 5

A separator was obtained in the same manner as Example 1, except that core-shell type polymer particles have a core portion including methyl methacrylate homopolymer and a shell portion including copolymer of 2-ethylhexyl acrylate with methyl methacrylate, and $T_g$ of the core portion and that of the shell portion of the core-shell type polymer particles, and average $T_g$ and diameter of the core-shell type polymer particles are those as shown in Table 1.

Example 6

A separator was obtained in the same manner as Example 1, except that core-shell type polymer particles have a core portion including copolymer of 2-ethylhexyl acrylate with methyl methacrylate and a shell portion including copolymer of 2-ethylhexyl acrylate with methyl methacrylate, and $T_g$ of the core portion and that of the shell portion of the core-shell type polymer particles, and average $T_g$ and diameter of the core-shell type polymer particles are those as shown in Table 1.

Example 7

A separator was obtained in the same manner as Example 1, except that core-shell type polymer particles have a core portion including copolymer of 2-ethylhexyl acrylate with methyl methacrylate and a shell portion including copolymer of 2-ethylhexyl acrylate with methyl methacrylate, and $T_g$ of the core portion and that of the shell portion of the core-shell type polymer particles, and average $T_g$ and diameter of the core-shell type polymer particles are those as shown in Table 1.

Example 8

A separator was obtained in the same manner as Example 1, except that core-shell type polymer particles have a core portion including copolymer of 2-ethylhexyl acrylate with methyl methacrylate and a shell portion including copolymer of 2-ethylhexyl acrylate with methyl methacrylate, and $T_g$ of the core portion and that of the shell portion of the core-shell type polymer particles, and average $T_g$ and diameter of the core-shell type polymer particles are those as shown in Table 2.

Example 9

A separator was obtained in the same manner as Example 1, except that core-shell type polymer particles have a core portion including copolymer of 2-ethylhexyl acrylate with methyl methacrylate and a shell portion including copolymer of 2-ethylhexyl acrylate with methyl methacrylate, and $T_g$ of the core portion and that of the shell portion of the core-shell type polymer particles, and average $T_g$ and diameter of the core-shell type polymer particles are those as shown in Table 2.

Comparative Example 1

A separator was obtained in the same manner as Example 1, except that core-shell type polymer particles have a core portion including copolymer of 2-ethylhexyl acrylate with methyl methacrylate and a shell portion including 2-ethylhexyl acrylate homopolymer, and $T_g$ of the core portion and that of the shell portion of the core-shell type polymer particles, and average $T_g$ and diameter of the core-shell type polymer particles are those as shown in Table 1.

Comparative Example 2

A separator was obtained in the same manner as Example 1, except that core-shell type polymer particles have a core portion including 2-ethylhexyl acrylate homopolymer and a shell portion including methyl methacrylate homopolymer, and $T_g$ of the core portion and that of the shell portion of the core-shell type polymer particles, and average $T_g$ and diameter of the core-shell type polymer particles are those as shown in Table 1.

Comparative Example 3

A separator was obtained in the same manner as Example 1, except that core-shell type polymer particles have a core portion including copolymer of 2-ethylhexyl acrylate with methyl methacrylate and a shell portion including methyl methacrylate homopolymer, and $T_g$ of the core portion and that of the shell portion of the core-shell type polymer particles, and average $T_g$ and diameter of the core-shell type polymer particles are those as shown in Table 1.

Comparative Example 4

A separator was obtained in the same manner as Example 1, except that core-shell type polymer particles have a core portion including methyl methacrylate homopolymer and a shell portion including copolymer of 2-ethylhexyl acrylate with methyl methacrylate, and $T_g$ of the core portion and that of the shell portion of the core-shell type polymer particles, and average $T_g$ and diameter of the core-shell type polymer particles are those as shown in Table 1.

Comparative Example 5

A separator was obtained in the same manner as Example 1, except that core-shell type polymer particles have a core portion including copolymer of 2-ethylhexyl acrylate with methyl methacrylate and a shell portion including copolymer of 2-ethylhexyl acrylate with methyl methacrylate, and $T_g$ of the core portion and that of the shell portion of the core-shell type polymer particles, and average $T_g$ and diameter of the core-shell type polymer particles are those as shown in Table 1.

Comparative Example 6

A separator was obtained in the same manner as Example 1, except that core-shell type polymer particles have a core portion including copolymer of 2-ethylhexyl acrylate with methyl methacrylate and a shell portion including copolymer of 2-ethylhexyl acrylate with methyl methacrylate, and $T_g$ of the core portion and that of the shell portion of the core-shell type polymer particles, and average $T_g$ and diameter of the core-shell type polymer particles are those as shown in Table 1.

Comparative Example 7

A separator was obtained in the same manner as Example 1, except that core-shell type polymer particles have a core portion including copolymer of 2-ethylhexyl acrylate with methyl methacrylate and a shell portion including copolymer of 2-ethylhexyl acrylate with methyl methacrylate, and $T_g$ of the core portion and that of the shell portion of the core-shell type polymer particles, and average $T_g$ and diameter of the core-shell type polymer particles are those as shown in Table 2.

Comparative Example 8

A separator was obtained in the same manner as Example 1, except that core-shell type polymer particles have a core portion including copolymer of 2-ethylhexyl acrylate with methyl methacrylate and a shell portion including copolymer of 2-ethylhexyl acrylate with methyl methacrylate, and $T_g$ of the core portion and that of the shell portion of the core-shell type polymer particles, and average $T_g$ and diameter of the core-shell type polymer particles are those as shown in Table 2.

Comparative Example 9

A separator was obtained in the same manner as Example 1, except that core-shell type polymer particles have a core portion including copolymer of 2-ethylhexyl acrylate with methyl methacrylate and a shell portion including copolymer of 2-ethylhexyl acrylate with methyl methacrylate, and $T_g$ of the core portion and that of the shell portion of the core-shell type polymer particles, and average $T_g$ and diameter of the core-shell type polymer particles are those as shown in Table 2.

Comparative Example 10

A separator was obtained in the same manner as Example 1, except that a single type of particles including copolymer of 2-ethylhexyl acrylate with methyl methacrylate were used instead of core-shell type polymer particles, and average $T_g$ and diameter of the single type of particles are those as shown in Table 2.

Comparative Example 11

A separator was obtained in the same manner as Example 1, except that a single type of particles including copolymer of 2-ethylhexyl acrylate with methyl methacrylate were used instead of core-shell type polymer particles, and average $T_g$ and diameter of the single type of particles are those as shown in Table 2.

Test Results

Each of the separators according to Examples 1-7 and Comparative Examples 1-6 was evaluated for glass transition temperature ($T_g$) of core-shell type polymer particles, average diameter of core-shell type polymer particles, separator-anode adhesion (gf/25 mm) and resistance. The results are shown in the following Table 1. In addition, each of the separators according to Examples 8 and 9 and Comparative Examples 7-11 was evaluated for glass transition temperature ($T_g$), separator-anode adhesion (gf/25 mm) and rate (%) of increase in resistance after lamination of the electrode (anode) with the separator. The results are shown in the following Table 2.

Particularly, each test was carried out as follows.

(1) Determination of Glass Transition Temperature ($T_g$) of Core-Shell Type Polymer Particles A differential scanning calorimeter (DSC, TA Instrument) was used to determine glass transition temperature ($T_g$).

Each separator was observed through field emission scanning electron microscopy (FE-SEM).

The average $T_g$ of a core portion and shell portion was calculated by the following formula:

Average $T_g$ of core portion and shell portion=($T_g$ of core portion)×(ratio (%) of diameter of core portion)+($T_g$ of shell portion)×(100−ratio (%) of core portion)

In Tables 1 and 2, the average diameter of a shell portion is defined as the value calculated by subtracting the average diameter of a core portion from the average diameter of the total core-shell type polymer particles.

The ratio (%) of diameter of core portion was calculated from the ratio (%) of the average diameter of a core portion based on the average diameter of the total core-shell type polymer particles.

In addition, the ratio of the average diameter (a) of core-shell type polymer particles based on the average diameter (b) of the inorganic particles is represented by a/b in Tables 1 and 2.

(2) Evaluation of Separator-Anode Adhesion (Gf/25 mm)

Active materials (natural graphite and artificial graphite (weight ratio 5:5)), a conductive material (Super P), a binder (polyvinylidene fluoride (PVdF)) were mixed at a weight ratio of 92:2:6 and dispersed in water. The resultant slurry was coated on copper foil to obtain an anode and the anode was cut into a size of 25 mm×70 mm.

Each of the separators according to Examples 1-9 and Comparative Examples 1-11 was cut into a size of 25 mm×70 mm.

The prepared separator was inserted between PET films having a thickness of 100 μm and adhered by using a flat press. Herein, the flat press was heated and pressurized at 90° C. under a pressure of 8 MPa for 1 second.

The end portion of the adhered separator-anode was mounted to a UTM instrument (LLOYD Instrument LF Plus), and force was applied at a rate of 300 mm/min in both directions. The force required for separating the separator from the anode was measured.

(3) Resistance of Separator

Each of the separators according to Examples 1-9 and Comparative Examples 1-11 was impregnated with an electrolyte and resistance was determined. Herein, the resistance of each separator was determined by using 1M $LiPF_6$- ethylene carbonate/ethylmethyl carbonate (weight ratio 3:7) as an electrolyte at 25° C. through an alternating current process.

(4) Rate of Increase in Resistance after Lamination of Electrode (Anode) with Separator Active materials (natural graphite and artificial graphite (weight ratio 5:5)), a conductive material (Super P), a binder (polyvinylidene fluoride (PVdF)) were mixed at a weight ratio of 92:2:6 and dispersed in water. The resultant slurry was coated on copper foil to obtain an anode and the anode was cut into a size of 25 mm×70 mm.

Each of the separators according to Examples 8 and 9 and Comparative Examples 7-11 was laminated with the electrode (anode) prepared as described above by using a flat press heated to 90° C. under a pressure of 8.5 MPa for 1 second. The laminated separator-anode was determined for resistance, the resultant resistance value was compared with the resistance of the separator alone obtained from part (3), and a rate of increase in resistance was calculated by the following formula:

Rate of increase in resistance (%)=[(Resistance of laminated separator-anode)−(Resistance of separator)]/(Resistance of separator)×100

TABLE 1

| | $T_g$(° C.) of core-shell type polymer particles | | | Average diameter (nm) of core-shell type polymer particles | | | Average diameter of core-shell type polymer particles (a) | Ratio of diameter of core portion (%) | Average diameter of inorganic particles (b) | a/b (%) | Separator-anode adhesion (gf/25 mm) | Resistance (Ω) |
|---|---|---|---|---|---|---|---|---|---|---|---|---|
| | $T_g$ of core portion | $T_g$ of shell portion | Average $T_g$ | Difference in $T_g$ between core portion and shell portion | Average diameter of core portion | Average diameter of shell portion | | | | | | |
| Ex. 1 | 50 | −50 | −2 | 100 | 235 | 250 | 485 | 48 | 500 | 97 | 145 | 1.24 |
| Ex. 2 | 110 | −50 | 26.8 | 160 | 235 | 250 | 485 | 48 | 500 | 97 | 152 | 0.97 |
| Ex. 3 | 50 | 10 | 29.2 | 40 | 235 | 250 | 485 | 48 | 500 | 97 | 113 | 1.17 |
| Ex. 4 | 70 | 30 | 49.2 | 40 | 235 | 250 | 485 | 48 | 500 | 97 | 86 | 1.06 |
| Ex. 5 | 110 | 50 | 78.8 | 60 | 235 | 250 | 485 | 48 | 500 | 97 | 55 | 0.88 |
| Ex. 6 | 50 | −50 | −2 | 100 | 220 | 220 | 420 | 48 | 500 | 84 | 97 | 1.03 |
| Ex. 7 | 50 | −50 | −2 | 100 | 225 | 245 | 470 | 48 | 250 | 188 | 192 | 1.28 |
| Comp. Ex. 1 | −40 | −50 | −45.2 | 10 | 235 | 250 | 485 | 48 | 500 | 97 | 187 | 4.37 |
| Comp. Ex. 2 | −50 | 110 | 33.2 | −160 | 235 | 250 | 485 | 48 | 500 | 97 | 15 | 2.03 |
| Comp. Ex. 3 | 50 | 110 | 81.2 | −60 | 235 | 250 | 485 | 48 | 500 | 97 | 8 | 0.65 |
| Comp. Ex. 4 | 110 | 70 | 89.2 | 60 | 235 | 250 | 485 | 48 | 500 | 97 | 25 | 0.76 |
| Comp. Ex. 5 | 50 | −50 | −2 | 100 | 170 | 180 | 350 | 48 | 500 | 70 | 46 | 0.76 |
| Comp. Ex. 6 | 50 | −50 | −2 | 100 | 265 | 285 | 550 | 48 | 250 | 220 | 199 | 1.69 |

TABLE 2

| | $T_g$(° C.) of core-shell type polymer particles | | | | Average diameter (nm) of core-shell type polymer particles | | | | | | | | Rate of increase in resistance after lamination of anode with separator (%) |
|---|---|---|---|---|---|---|---|---|---|---|---|---|---|
| | Tg of core portion | Tg of shell portion | Average Tg | Difference in Tg between core portion and shell portion | Average diameter of core portion | Average diameter of shell portion | Average diameter of core-shell type polymer particles (a) | Ratio of diameter of core portion (%) | Average diameter of inorganic particles (b) | a/b (%) | Separator-anode adhesion (gf/25 mm) | Resistance (Ω) | |
| Ex. 8 | 50 | 30 | 38 | 20 | 200 | 300 | 500 | 40 | 500 | 100 | 86 | 0.99 | 75 |
| Ex. 9 | 50 | 30 | 39.4 | 20 | 250 | 278 | 528 | 47 | 500 | 105.6 | 92 | 1.00 | 50 |
| Comp. Ex. 7 | 50 | 30 | 34 | 20 | 100 | 400 | 500 | 20 | 500 | 100 | 84 | 1.00 | 180 |
| Comp. Ex. 8 | 50 | 30 | 42.2 | 20 | 300 | 194 | 494 | 61 | 500 | 98.8 | 89 | 1.00 | 105 |
| Comp. Ex. 9 | 50 | 30 | 42.8 | 20 | 350 | 193 | 543 | 64 | 500 | 108.6 | 86 | 1.01 | 125 |
| Comp. Ex. 10 | 30 (single type of particles) | | | | — | — | 485 | 0 | 500 | 97 | 82 | 1.12 | 232 |
| Comp. Ex. 11 | 50 (single type of particles) | | | | — | — | 458 | 0 | 500 | 91.6 | 61 | 0.87 | 86 |

Referring to Tables 1 and 2, each of the separators according to Examples 1-9, which uses core-shell type polymer particles satisfying that $T_g$ of the core portion is higher than $T_g$ of the shell portion, as well as the average $T_g$ of the core-shell type polymer particles is 0-80° C., shows improved adhesion to the electrode and excellent effect of reducing the resistance of the separator itself and the resistance after lamination of the anode with the separator, as compared to the separators according to Comparative Examples 1-11, which use single type of particles or do not satisfy at least one of the above-mentioned conditions, despite the use of core-shell type polymer particles.

What is claimed is:

1. A separator comprising:
a porous polymer substrate having a plurality of pores; and
a porous coating layer on at least one surface of the porous polymer substrate,
wherein the porous coating layer comprises inorganic particles, core-shell polymer particles having a core portion and a shell portion surrounding the core portion, and a binder polymer positioned on a whole or a part of a surface of the inorganic particles and core-shell polymer particles to connect and fix the inorganic particles and core-shell polymer particles with one another,
wherein the core portion has a glass transition temperature, $T_g$, higher than a glass transition temperature, $T_g$, of the shell portion in the core-shell polymer particles,
the core-shell polymer particles have an average glass transition temperature, $T_g$, of −5° C. to 80° C.,
a ratio of an average diameter of the core-shell polymer particles to an average diameter of the inorganic particles is 80% to 200%, and
a ratio of an average diameter of the core portion to an average diameter of the core-shell type polymer particles is 30% to 60%.

2. The separator according to claim 1, wherein a difference between the $T_g$ of the core portion of the core-shell polymer particles and the $T_g$ of the shell portion of the core-shell polymer particles is 10° C. to 200° C.

3. The separator according to claim 1, wherein the ratio of the average diameter of the core-shell polymer particles to the average diameter of the inorganic particles is 80% to 190%.

4. The separator according to claim 1, wherein the ratio of the average diameter of the core portion of the core-shell polymer particles to the average diameter of the core-shell type-polymer particles is 30% to 50%.

5. The separator according to claim 1, wherein each of the core portion and the shell portion of the core-shell polymer particles independently comprises: a styrene-based polymer, diene-based polymer, acrylate-based polymer, ester-based polymer, olefin-based polymer, urethane-based polymer; polymer including styrene-derived repeating units, diene-derived repeating units, acrylate-derived repeating units, ester-derived repeating units, olefin-derived repeating units, urethane-derived repeating units, or at least two types of repeating units of them; or a mixture of two or more of such polymers.

6. The separator according to claim 5, wherein each of the core portion and the shell portion of the core-shell polymer particles independently comprises at least one of polystyrene, styrene butadiene copolymer, ethylene propylene diene copolymer, poly(meth)acrylate, polyalkyl (meth)acrylate, alkyl acrylate-alkyl (meth)acrylate copolymer, polyfluoroalkyl (meth)acrylate, polyacrylonitrile, polyester, polyethylene, polypropylene, ethylene propylene copolymer, polytetrafluoroethylene, chlorosulfonated polyethylene, polyethylene oxide, polyvinyl alcohol, polyvinyl pyrrolidone, polyvinyl pyridine, polyphosphazene, epoxy resin, butadiene rubber, styrene-butadiene rubber, acrylated styrene-butadiene rubber, acrylic rubber, acrylonitrile-butadiene rubber, acrylonitrile-butadiene-styrene rubber, isoprene rubber, isobutylene-isoprene rubber, ethylene-propylene rubber, ethylene-propylene-diene rubber, polyorganosiloxane-polyalkyl (meth)acrylate rubber, or fluororubber.

7. The separator according to claim 1, wherein the porous polymer substrate is a polyolefin-based porous polymer substrate.

8. The separator according to claim 1, wherein the binder polymer is at least one of polyvinylidene fluoride-co-hexafluoropropylene, polyvinylidene fluoride-co-trichloroethylene, polymethyl methacrylate, polybutyl acrylate, polybutyl methacrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinyl alcohol, cyanoethyl cellulose, cyanoethyl sucrose, pullulan, or carboxymethyl cellulose.

9. The separator according to claim 1, wherein the inorganic particles are at least one of inorganic particles having a dielectric constant of 5 or more, or inorganic particles having lithium ion transportability.

10. An electrochemical device comprising a cathode, an anode and a separator interposed between the cathode and the anode, wherein the separator is the separator as defined in claim 1.

11. The electrochemical device according to claim 10, wherein the electrochemical device is a lithium secondary battery.

* * * * *